US009463419B2

(12) United States Patent
Breitner (10) Patent No.: US 9,463,419 B2
(45) Date of Patent: Oct. 11, 2016

(54) PULSE AERATION FOR IMMERSED MEMBRANES (75) Inventor: Joseph Breitner, Thornhill (CA)

(73) Assignee: General Electric Company, Schenectady, NY (US)

(*) Notice: Subject to any disclaimer, the term of this patent is extended or adjusted under 35 U.S.C. 154(b) by 485 days.

(21) Appl. No.: 13/346,176

(22) Filed: Jan. 9, 2012

(65) Prior Publication Data
US 2013/0175217 A1 Jul. 11, 2013

(51) Int. Cl.
B01D 65/08 (2006.01)
B01D 61/18 (2006.01)
B01F 3/04 (2006.01)
C02F 1/44 (2006.01)
B01D 63/02 (2006.01)

(52) U.S. Cl.
CPC .............. *B01D 65/08* (2013.01); *B01D 61/18* (2013.01); *B01F 3/04255* (2013.01); *C02F 1/444* (2013.01); *B01D 63/02* (2013.01); *B01D 2313/18* (2013.01); *B01D 2313/26* (2013.01); *B01D 2315/06* (2013.01); *B01D 2315/20* (2013.01); *B01D 2321/185* (2013.01); *B01F 2003/04148* (2013.01); *B01F 2003/04276* (2013.01); *B01F 2003/04304* (2013.01); *B01F 2003/04411* (2013.01)

(58) Field of Classification Search
None
See application file for complete search history.

(56) References Cited

U.S. PATENT DOCUMENTS

| 1,574,783 | A | | 6/1925 | Beth |
| 3,068,655 | A | | 12/1962 | Murray et al. |
| 3,592,450 | A | | 7/1971 | Rippon |
| 3,628,775 | A | | 12/1971 | McConnell |
| 3,847,508 | A | | 11/1974 | Mowen |
| 3,898,018 | A | | 8/1975 | Weis |
| 3,993,062 | A | * | 11/1976 | Jess .............................. 604/126 |
| 4,169,873 | A | | 10/1979 | Lipert |
| 4,187,263 | A | | 2/1980 | Lipert |
| 4,356,131 | A | | 10/1982 | Lipert |
| 4,439,316 | A | | 3/1984 | Kozima et al. |

(Continued)

FOREIGN PATENT DOCUMENTS

| CN | 1931419 | | 9/2005 |
| DE | 2453670 | A1 | 5/1975 |

(Continued)

OTHER PUBLICATIONS

"Valve." The American Heritage(r) Dictionary of the English Language. Boston: Houghton Mifflin, 2011. Credo Reference. Web. Apr. 8, 2014.*

(Continued)

*Primary Examiner* — Katherine Zalasky
*Assistant Examiner* — Kara Graber (57) ABSTRACT An assembly of immersed filtering membrane modules on the order of a cassette or larger are aerated in a series of air-on or high flow rate periods, each in the range of 0.5 to 20 seconds long, separated by longer air-off or low flow rate periods, each in the range of 5 to 40 seconds long. A manifold is in fluid communication with one or more aerators. The manifold and aerators are located in association with the modules. The assembly of immersed filtering membrane modules are provided with a burst of air from the plurality of aerators. The aerators may be fed with a continuous supply of air. The modules may be connected together in a cassette or rack. Bubbles from the aerators may be redirected or dissipated with a deflector before they contact the modules.

16 Claims, 6 Drawing Sheets

(56) References Cited

U.S. PATENT DOCUMENTS

| | | |
|---|---|---|
| 4,478,211 A | 10/1984 | Haines et al. |
| 4,501,664 A | 2/1985 | Heil et al. |
| 4,569,804 A | 2/1986 | Murphy |
| 4,752,421 A | 6/1988 | Makino |
| 4,789,503 A | 12/1988 | Murphy |
| 4,828,696 A | 5/1989 | Makino et al. |
| 4,906,363 A | 3/1990 | Makino et al. |
| 4,911,838 A | 3/1990 | Tanaka |
| 4,923,614 A | 5/1990 | Engelbart |
| 5,169,781 A | 12/1992 | Nojima et al. |
| 3,246,761 A | 4/1996 | Bryan |
| 5,605,653 A | 2/1997 | DeVos |
| 5,620,891 A | 4/1997 | Drummond et al. |
| 6,162,020 A | 12/2000 | Kondo |
| 6,245,239 B1 | 6/2001 | Cote et al. |
| 6,517,724 B1 | 2/2003 | Malone |
| 7,017,557 B2 | 3/2006 | Rumpf |
| 7,077,208 B2 | 7/2006 | Harrington et al. |
| 7,294,255 B2 | 11/2007 | Kondo |
| 7,867,395 B2 | 1/2011 | Ekholm et al. |
| 7,879,229 B2 | 2/2011 | Phagoo et al. |
| 2004/0112831 A1 | 6/2004 | Rabie et al. |
| 2004/0139992 A1 | 7/2004 | Murkute et al. |
| 2005/0006308 A1 | 1/2005 | Cote et al. |
| 2005/0077237 A1 | 4/2005 | Wickham |
| 2005/0126963 A1 | 6/2005 | Phagoo et al. |
| 2006/0201876 A1 | 9/2006 | Jordan |
| 2007/0166171 A1 | 7/2007 | Kondo |
| 2009/0194477 A1 | 8/2009 | Hashimoto |
| 2010/0288696 A1 | 11/2010 | Liao et al. |
| 2010/0300968 A1 | 12/2010 | Liu et al. |
| 2011/0049047 A1 | 3/2011 | Cumin et al. |
| 2011/0198283 A1 | 8/2011 | Zha et al. |

FOREIGN PATENT DOCUMENTS

| | | |
|---|---|---|
| EP | 0937494 | 8/1999 |
| EP | 1119522 | 4/2004 |
| EP | 1652572 | 5/2006 |
| EP | 1897857 | 3/2008 |
| GB | 996195 | 6/1965 |
| JP | 57059689 A | 4/1982 |
| JP | 01104396 | 4/1989 |
| JP | 01111494 | 4/1989 |
| JP | 3229692 A | 10/1991 |
| JP | 04265128 | 9/1992 |
| JP | 07-185270 | 7/1995 |
| JP | 07185271 | 7/1995 |
| JP | 08141566 | 4/1996 |
| JP | 08312161 | 11/1996 |
| JP | 09-038470 | 2/1997 |
| JP | 09220569 | 8/1997 |
| JP | 2003-340250 | 12/2003 |
| JP | 2004322100 | 11/2004 |
| JP | 2006081979 | 3/2006 |
| WO | 9706880 | 2/1997 |
| WO | 9828066 | 7/1998 |
| WO | 0021890 | 4/2000 |
| WO | 0021890 A1 | 4/2000 |
| WO | 2004050221 | 6/2004 |
| WO | 2004056458 | 7/2004 |
| WO | 2005105275 | 11/2005 |
| WO | 2006029465 | 3/2006 |
| WO | 2008153818 | 12/2008 |
| WO | 2013009802 A2 | 1/2013 |

OTHER PUBLICATIONS

INFILCO DEGREMONT, Infilco Cannon Mixer—Enhanced Sludge Mixing Technology, downloaded from http://www.degremont-technologies.com/IMG/pdf/INFILCO-CannonMixer-EN-US.pdf on Oct. 1, 2012.
INFILCO DEGREMONT, Cannon Mixer, Undated.
Search Report and Written Opinion from corresponding PCT Application No. PCT/US2012/071159 dated Apr. 18, 2013.
SHINKO PFAUDLER CO LTD, English Abstract of JP 01111494 published Apr. 28, 1989.
SHINKO PFAUDLER CO LTD, English Abstract of JP 01104396 published Apr. 21, 1989.
International Search Report and Written Opinion issued in connection with PCT/US2010/043926, Oct. 21, 2010.
KURITA WATER IND LTD, English Abstract of JP 07185270 published Jul. 25, 1995.
KURITA WATER IND LTD, English Abstract of JP 2004322100 published Nov. 18, 2004.
KURITA WATER IND LTD, English Abstract of JP 07185271 published Jul. 25, 1995.
Murase et al., English Abstract of JP 09-038470 published Feb. 10, 1997.
CHINA PETROCHEMICAL CORP., English Abstract of CN1931419 published Sep. 16, 2005.
MINI-JECT Above-Grade Ejector Lift Station, from http://smithandloveless.com/cgi-local/H2O/H2O.cgi?db+pumps& . . . , printed Jan. 28, 2009, Smith and Loveless.
ASAHI KASEI CHEMICALS, English Abstract of JP2006081979 published Mar. 30, 2006.
KUBOTA CORP, English Abstract of JP 09220569 published Dec. 25, 1997.
AINTETSUKU:KK, English Abstract of JP 08312161 published Nov. 26, 1996.
KUBOTA CORP, English Abstract of JP 08141566 published Jun. 4, 1996.
Kondo, Masao et al., Reexamination of the Gas Sparging Mechanism for Membrane Fouling Control, Proceedings of the Water Environment Federation, WEFTEC 2010: Session 91 through Session 100, pp. 6986-7007(22), Jan. 1, 2010.
International Search Report and Written Opinion issued on PCT/US2012/046159 dated Feb. 20, 2013.
US Final Office Action issued in connection with Related U.S. Appl. No. 13/181,776 on Aug. 28, 2015.
Georg Hamburger & Co KG, English language abstract of DE2453670, published May 15, 1975.

\* cited by examiner

PULSE AERATION FOR IMMERSED MEMBRANES

FIELD

The present disclosure relates to submerged membrane filtration and particularly to using scouring air bubbles produced by an aeration system to clean or inhibit the fouling of membranes in a submerged membrane filter.

BACKGROUND

The following discussion is not an admission that anything discussed below is common knowledge or citable as prior art.

Immersed membranes are used, for example, for filtering water in municipal water supply treatment plants and in wastewater treatment plants. The membranes may be microfiltration or ultrafiltration membranes made in the form of modules of hollow fiber membranes. In large plants, many modules are immersed in the water to be filtered in an open tank and filtered water, also called permeate, is withdrawn through the membranes by suction. In a typical filtration cycle, a period of permeation, for example for 15 minutes to an hour, is followed by a relatively short period of backwashing or relaxation, and then the cycle repeats. In wastewater plants, and also in some water supply plants, the membranes are scoured with bubbles during permeation to clean or inhibit fouling in the membranes. The bubbles are provided according to an aeration regime that is applied throughout most, and possibly all, of the permeation part of the filtration cycle, and possibly during the backwash or relaxation part of the cycle as well. The aeration regime uses a significant amount of energy, adding to the cost and environmental impact of the plant. Accordingly, there have been various attempts to reduce the energy required by the aeration regime while still maintaining an acceptable fouling rate in the membranes.

A cyclic aeration system is described in International Publication Number WO 2000/021890, published Apr. 20, 2000. In a version of this system used by GE Water and Process Technologies with its ZEEWEED™ hollow fiber membrane modules, air from one or more blowers is split through a set of controlled valves into two or four sets of aerators. The valves distribute the air to the sets of aerators in turn. For example, with two sets of aerators the air may be sent first to one set of aerators and then to the other set of aerators. An assembly of filtering membrane modules are connected together in a frame to provide a larger unit called a rack or cassette. There are typically several aerators below a cassette, but all of these aerators are part of the same assembly of aerators. In this case, the cassette experiences an aeration regime wherein bubbles are provided for a period of time, and then not generally provided for a period of time, in repeated cycles. For example, with two sets of aerators, bubbles may be provided to a cassette for 10 seconds out of every 20 seconds. This is also called a 10 seconds on, 10 seconds off cycle, or simply a 10, 10 cycle. With four sets of aerators, bubbles may be provided to a cassette for 10 seconds out of every 40 seconds, or in a 10, 30 cycle. In some plants, the valve set allows the system to switch between these two regimes depending, for example, on variations in the fouling qualities of the water or the feed flow rate.

In the MEMPULSE™ system by Siemens Water Technologies Corp., each module is provided with an integrated pulsing air lift pump. Each module in a rack or cassette has an air tube connecting its air lift pump to a common air supply pipe. The air tube discharges air into an inverted cup in the pulsing air lift pump. A pocket of air grows inside the cup until it extends downwards to a critical elevation, at which point most of the air in the pocket discharges into the adjacent vertical passageway. The passageway is open at its bottom end to draw in water in the tank, and its top is open to gaps in a lower potting head of the module. An air lift is formed in the passageway as the air rushes through, and bubbles and water are discharged through the gaps in the lower potting head into the module. The module experiences an aeration regime that, as in the cyclic aeration system, consists essentially of an air on—air off cycle. The precise timing of the cycle in commercial systems is not known to the inventor, but the related International Publication Number WO 2008/153818, published Dec. 18, 2008 suggests a cycle of roughly 2 seconds of bubbles, with entrained water, followed by 8 seconds without bubbles.

INTRODUCTION TO THE INVENTION

The cyclic aeration system has proven to be generally at least as effective as continuous aeration in inhibiting membrane fouling while requiring only one half the amount of air. The MEMPULSE™ system avoids using controlled valves, but the pulsing air lift pumps might sometimes be fouled by solids in the wastewater. The inverted cup shape makes the airlift pump susceptible to fouling. Their location at the bottoms of the modules would make the air lift pumps difficult to monitor and service if they did foul. The 2-8 cycle appears to use less air than a 10-10 or 10-30 cycle because the air is on for a lesser percentage of the entire cycle time but the air flow rate in the air on time, which is unknown to the inventor, would also need to be considered in determining how much air is used in each regime. The air pressure in the inverted cup is limited to hydrostatic pressure.

In International Publication Number WO 2008/153818, the inventors of the air cycling system noted that a burst of large bubbles produced at the start of an air on period might be particularly effective at cleaning the membranes. The MEMPULSE™ system might seem to take advantage of such a burst of bubbles, but if so the effect is diminished by other aspects of the system. In particular, some of the energy of the bubbles is spent in drawing water through the air lift pumps.

In a process described herein, an aeration regime comprising bursts of bubbles is applied to an immersed assembly of filtering membrane modules, such as a rack or cassette of membrane modules. The bursts are provided by accumulating gas under pressure in one or more aerators and then releasing a burst of the gas from the one or more aerators to the assembly of filtering membrane modules above. The aeration regime may comprise, for example, a series of air-on or high flow rate periods, each in the range of 0.5 to 4 seconds long, separated by longer air-off or low flow rate periods, each in the range of 5 to 40 seconds long. Alternatively, longer air-on periods of 4 to 20 seconds may also be provided. The aerators are located inside a tank holding the rack or cassette, and may be fed with a continuous supply of gas.

In an apparatus described herein, one or more aerators are attached to and in fluid communication with one or more manifolds. Each of the manifolds is associated with one or more immersed assemblies of filtering membrane modules. Filtering membrane modules may be connected together in a cassette or rack. The one or more aerators and the manifolds to which the aerators are attached, are all located inside a tank of water with the assembly of filtering membrane modules. The one or more aerators may be fed with a continuous supply of gas through their corresponding manifold from one or more air blowers operating at a generally continuous speed and in fluid communication with the manifold. The release of gas from the aerators may be provided from a pressure sensitive automatic valve. The valve is located between the aerator and the water in the tank. Upon closing, the valve prevents sludge from entering and fouling the aerator or the manifold. The aerators, the manifolds, and the air blowers form a closed aeration system such that no sludge or wastewater may enter when the aerator valves are closed. After a threshold pressure in the aerator is reached, an aerator valve opens automatically to release the pressurized gas from the aeration system. The force of the pressurized gas as it exits from the aerators through the valve prevents wastewater from entering the aeration system when the valve is open. The valve closes automatically before the pressure in the aerator drops below the static pressure of the surrounding water to prevent water from entering the aerator. If a valve becomes fouled, the burst of the pressurized gas exiting the valve when the valve opens on its following cycle removes the fouling without having to alter the normal operation of the aeration system.

BRIEF DESCRIPTION OF THE DRAWINGS

One or more embodiments of the invention will now be described, by way of example, with reference to the attached Figures.

DETAILED DESCRIPTION

Figure 1:
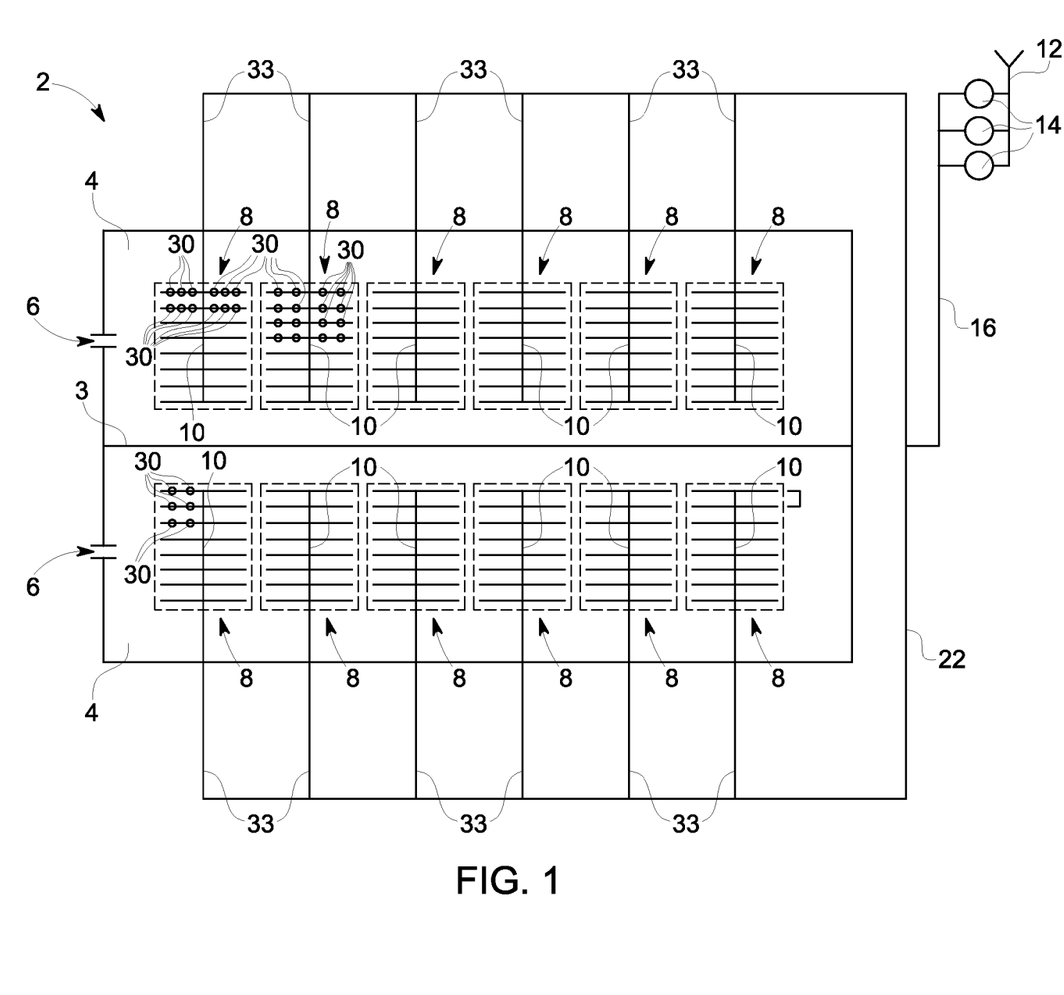
FIG. 1 shows a water treatment system in top view.

FIG. 1 shows a water treatment system 2 from a top view. The water treatment system 2 has one or more filtration tanks 4. If there are multiple tanks 4, they may be aligned in parallel and separated by a partition wall 3. Each tank 4 accepts feed water through an inlet 6. Water may be removed from a tank 4 through one or more of a permeate withdrawal system, a drain and a recycle conduit, which are not shown to simplify FIG. 1 since they are conventional parts of a water treatment system using immersed filtering membrane modules.

The tank 4 has one or more assemblies of filtering membrane modules 8 shown in dashed lines in FIG. 1. During filtration, the one or more assemblies of filtering membrane modules 8 are used to withdraw permeate from water in the tank 4 while rejecting solids, which remain in the tank 4 until they are digested, drained or removed in a recirculation line. A manifold 10 in fluid communication with one or more aerators 30 is associated with one or more of the assemblies of filtering membrane modules 8. The manifold 10 delivers a gas to the one or more aerators 30 located inside the tank 4 and beneath the one or more assemblies of filtering membrane modules 8. The one or more aerators 30 each independently release pressurized gas as bubbles which rise through the one or more associated assemblies of filtering membrane modules 8 to scour or clean the membranes.

To provide air to the manifolds 10 and then to the one or more aerators 30, air is drawn in through an air inlet 12 to a set of blowers 14. The blowers 14 may operate at a generally constant speed, thus providing a generally constant flow rate of air. By turning off one or more of the blowers 14, or reducing the speed of one or more of the blowers, a different flow rate of air can be provided. However, turning a blower 14 on and off frequently, or varying its speed often, can reduce the life of the blower 14. Accordingly, it is preferable to leave the blowers 14 either on or off, and when on, operate the blowers 14 at a constant speed for at least an hour or more at a time. Alternatively, systems can be provided to supply other gases, such as nitrogen, oxygen or oxygen enriched air or biogas.

The gas travels through a blower outlet pipe 16 to one or more distribution pipes 22 and then to one or more feeder pipes 33. Each feeder pipe 33 provides the gas to the one or more manifolds 10 which are connected to one or more aerators 30. Gas accumulates in the aerators 30 by increasing in pressure, optionally in combination with expansion of the aerators 30. When gas is released from an aerator 30, the gas flows out of the aerator 30 into the tank 4 and rises as bubbles through the one or more associated assemblies of filtering membrane modules 8 above. As will be described further below, gas is released from the aerators 30 in bursts, causing corresponding bursts of bubbles to be emitted.

Figure 2:
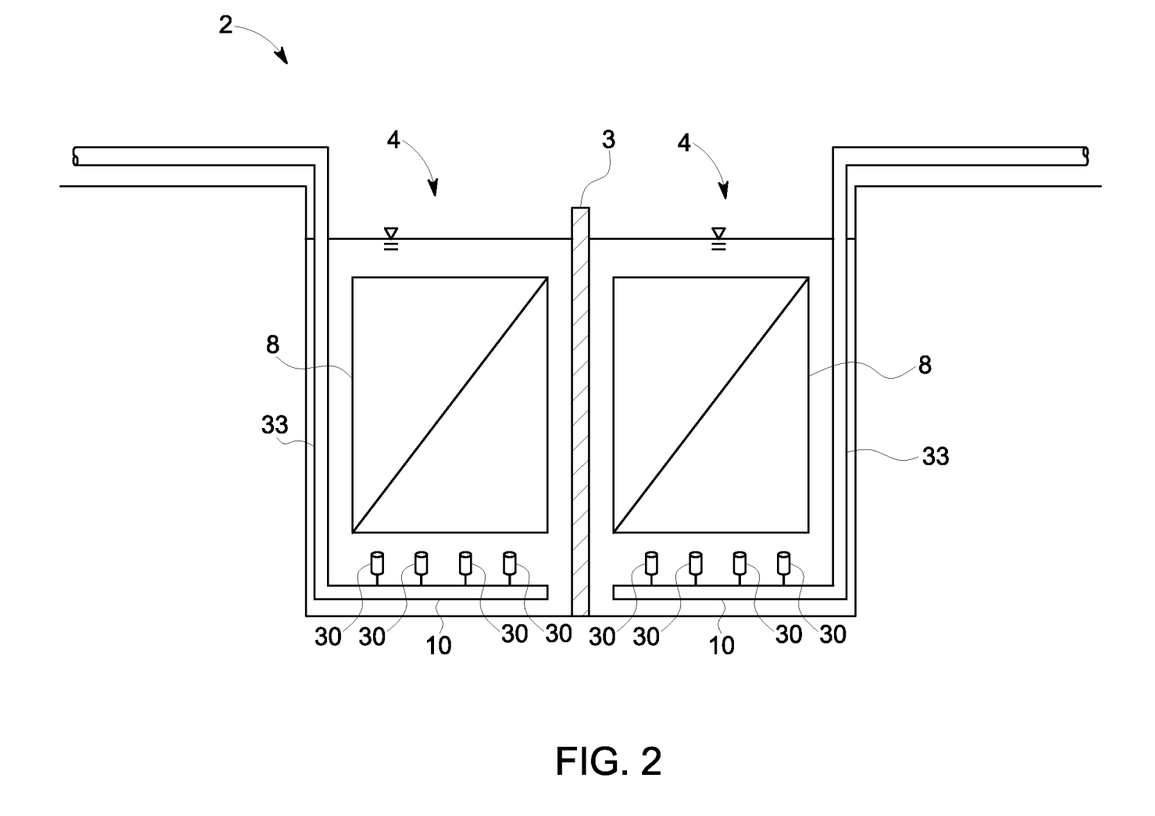
FIG. 2 shows the water treatment system of FIG. 1 in end view.

FIG. 2 shows the water treatment system 2 of FIG. 1 in a cross sectioned end view. As shown, an assembly of filtering membrane modules 8 is positioned above one or more aerators 30 connected in fluid communication to the manifold 10. The aerators 30 receive gas from the gas blowers 14 shown in FIG. 1 by way of the blower outlet pipe 16 and distribution pipe 22 shown in FIG. 1, the feeder pipe 33, and the manifolds 10. Bubbles released from the aerators 30 float towards the surface of the water in the tank 4. As they do so, the bubbles pass through the one or more assemblies of filtering membrane modules 8 to scour the membranes, thus cleaning them or decreasing their rate of fouling.

In operation, gas is emitted from one or more aerators 30, and bubbles are released into the water in the tank 4 at a rate that varies in repeated cycles. Each cycle may include a period during which gas accumulates in the aerator 30, followed by the release of a burst of the gas. Alternatively, a cycle may be described as having an "air-on" time and an "air-off" time. The flow rate during the burst, or air on time, could be generally constant or might rise to a peak flow rate and then decline again. There may be an abrupt transition to the accumulation stage, or air-off time, during which the flow of gas may be completely stopped. Alternatively, the flow rate in the air-on time may decrease gradually and the air air-off time may be deemed to occur when the rate of gas flow from an aerator 30 is 10% or less of the peak gas flow rate in the air on-time. The duration of the burst, or air-on time, may be between 0.5 and 20 seconds or between 0.5 and 4 seconds. The duration of the accumulation stage, or air-off time, may be between 5 and 40 seconds.

In the system 2 shown in FIG. 1, the timing of bursts of gas from the various aerators 30 is not intentionally synchronized. Although aerators 30 might emit their first burst of gas at the same time, over time the cycles of different aerators 30 may diverge from each other.

Figure 3A:
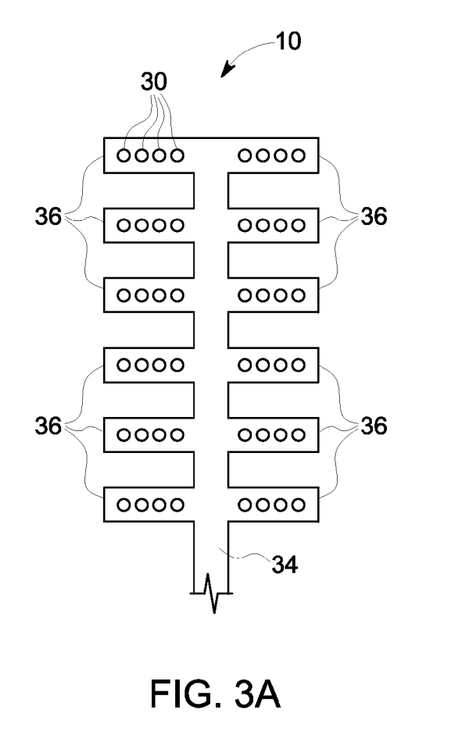
FIG. 3A shows an aeration device of the water treatment system of FIG. 1.

FIG. 3A shows a manifold 10 and the aerators 30 in greater detail. The manifold 10 has a header pipe 34. The header pipe 34 is connected to and receives gas from the feeder pipe 33 shown in FIG. 2 which is connected to and receives gas from the distribution pipe 22 shown in FIG. 1. A plurality of individual branches 36 extend from the header pipe 34. Each of the branches 36 may be a section of cylindrical pipe with one end connected to and in fluid communication with the header pipe 34, and the other end closed. Attached and in fluid communication with an individual branch 36 are one or more aerators 30.

Figure 3B:
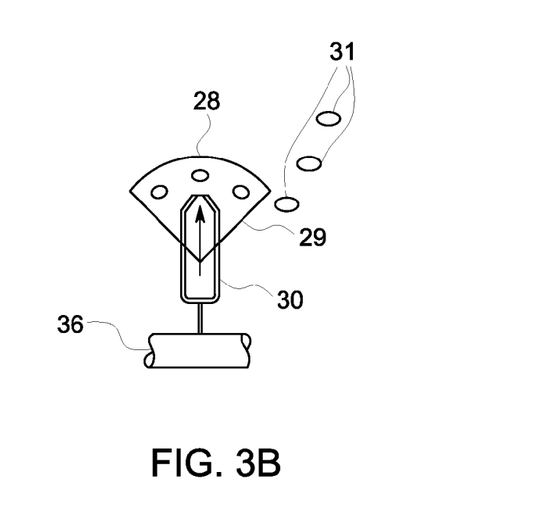
FIG. 3B shows a deflector connected to an aerator of the aeration device of FIG. 3A.

FIG. 3B shows a deflector 28 connected to, and spaced vertically from, the top of the aerator 30. The deflector 28 is an inverted cup which is affixed to the aerator 30 by two arms 29 which extend upwardly from opposite sides of the body of the aerator 30 to the rim of the deflector 28. The deflector 28 is located above each aerator 30 but below the assembly of filtering membrane modules 8 (not shown). As pressurized gas is released from the aerator 30 as bubbles 31, and the bubbles rise and come in contact with the deflector 28, the deflector 28 may dissipate large bubbles into smaller bubbles and/or redirect the bubbles.

Figure 3C:
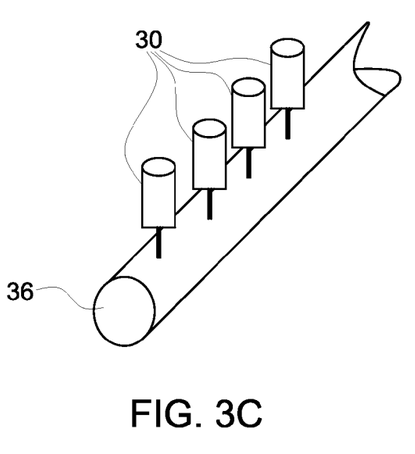
FIG. 3C shows a plurality of aerators aligned on a branch of the aeration device of FIG. 3A.

FIG. 3C shows a branch 36 of aerators 30 in greater detail. The aerators 30 are circumferentially aligned and longitudinally spaced lengthwise along the branch 36.

Figure 3D:
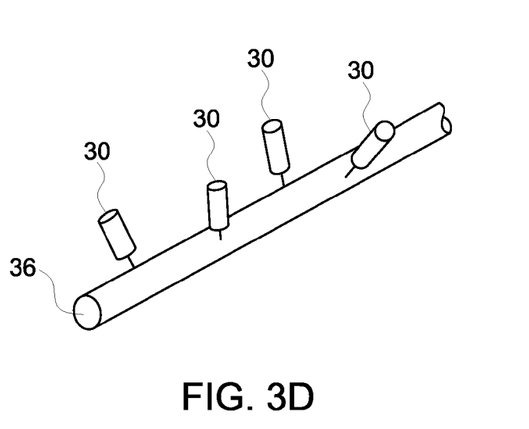
FIG. 3D shows an alternative arrangement to FIG. 3C of aligning a plurality of aerators on a branch of the aeration device of FIG. 3A.

FIG. 3D shows an alternative arrangement of the aerators 30 along the branch 36 of FIG. 3C. In the alternative arrangement, the aerators 30 are longitudinally spaced along, and circumferentially around, the top half portion of the branch 36.

Figure 4:
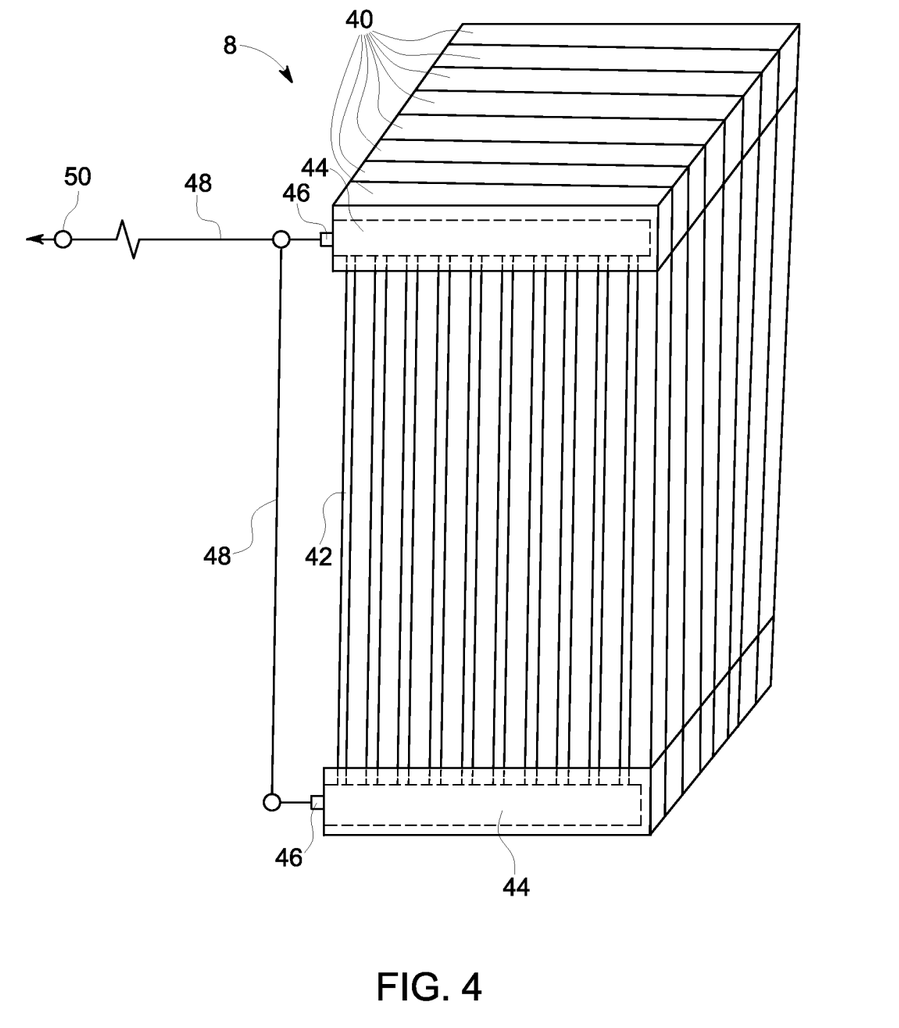
FIG. 4 shows an assembly of filtering membrane modules connected in a cassette.

FIG. 4 shows the assembly of filtering membrane modules 8 in greater detail. The assembly of filtering membrane modules 8 has one or more filtering membrane modules 40 arranged side by side. The filtering membrane modules 40 may be connected to each other or to a common frame (not shown). Each of the plurality of filtering membrane modules 40 has hollow fiber membranes 42 oriented generally vertically between two potting heads 44. The ends of the hollow fiber membranes 42 are connected to potting heads 44 by a watertight connection that allows permeate to be collected in at least one of the potting heads 44.

A potting head 44 may have a spigot 46 which is connected to one or more permeate collection pipes 48. The permeate connection to only one of the filtering membrane modules 40 is shown to simplify FIG. 4 but typically all of the filtering membrane modules 40 in a membrane assembly 8 would be connected at some point to a common permeate collection pipe 48. The permeate collection pipes 48 are connected to a permeate pump 50. When the permeate pump 50 is operated, a negative pressure is created in the hollow fiber membranes 42 relative to water in the tank 4 surrounding the hollow fiber membranes 42. The resulting transmembrane pressure draws water through the hollow fiber membranes 42.

An assembly of filtering membrane modules 8 can also be made according to other configurations. For example, filtering membrane modules 40 of vertically oriented hollow fiber membranes 42 may be round or square and connected together in rows or grids to form an assembly of filtering membrane modules 8. Filtering membrane module 40 may also have hollow fiber membranes 42 oriented horizontally. Filtering membrane modules 40 with horizontal membranes may be arranged into an assembly of filtering membrane modules 8 by placing them side by side or in grids, or by stacking them on top of each other, or both. Filtering membrane modules 40 may also have flat sheet membranes, and may be arranged into an assembly of filtering membrane modules 8 by placing them side by side or in grids, or by stacking them on top of each other, or both.

FIGS. 5A to 5D show an example of an aerator 30 in sequential stages of operation. The aerator 30 of FIGS. 5A to 5D has a flexible membrane 52 with a first end 54 connected to an inlet 26. A second end 56 of the flexible membrane 52 is connected to an outlet 32. A stopper 58 is provided at the second end 56. The stopper 58 and the second end 56 cooperate to form a valve which prevents gas from exiting from the flexible membrane 52 until a threshold pressure within the flexible membrane 52 is reached. When the threshold pressure is reached, the second end 56 expands so that the seal between the stopper 58 and the second end 56 is released.

Figure 5A:
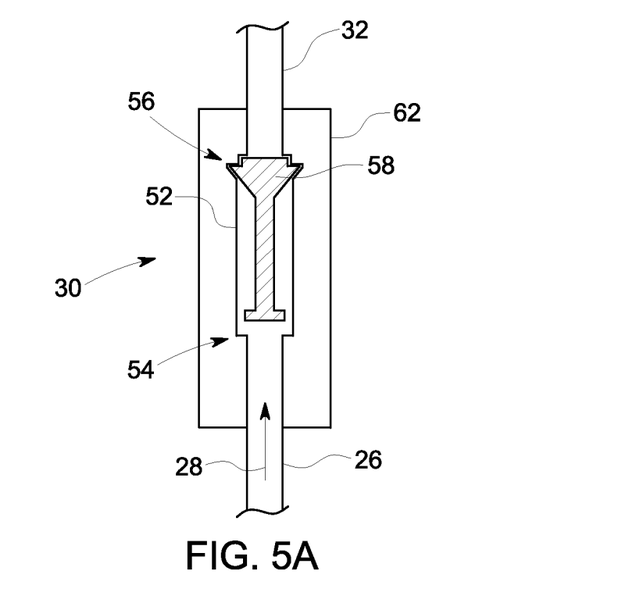
FIGS. 5A to 5D show a device for discharging bursts of a pressurized gas.
Figure 5B:
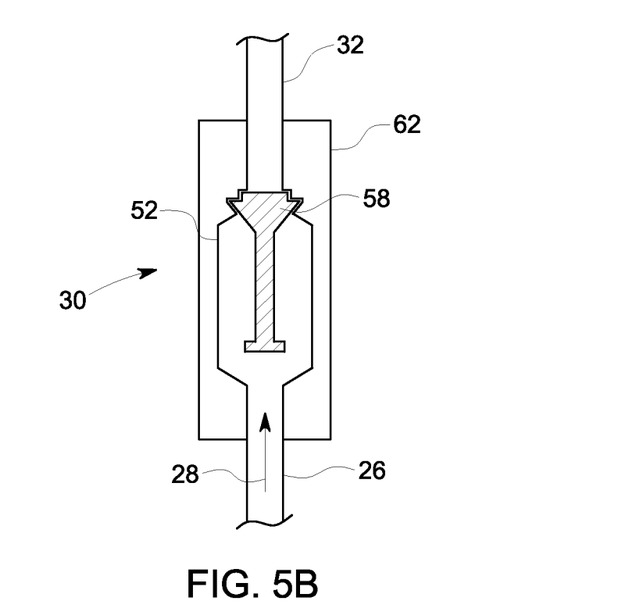
Figure 5C:
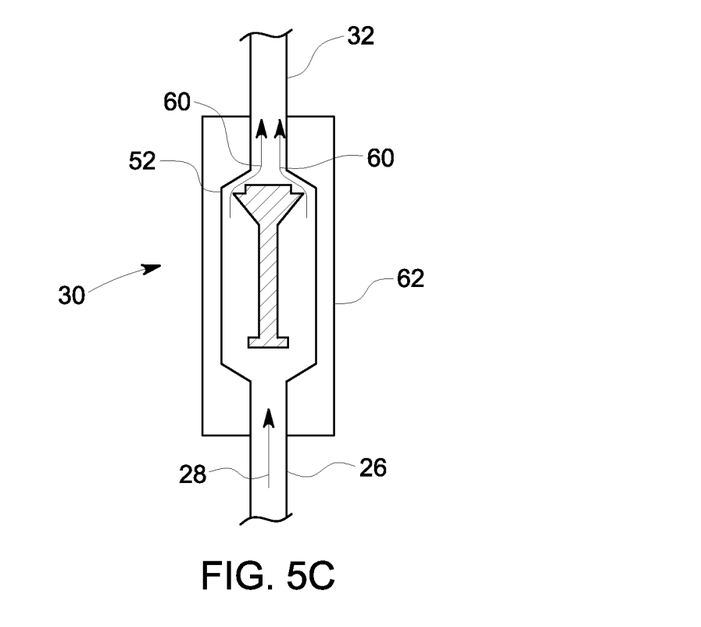
Figure 5D:
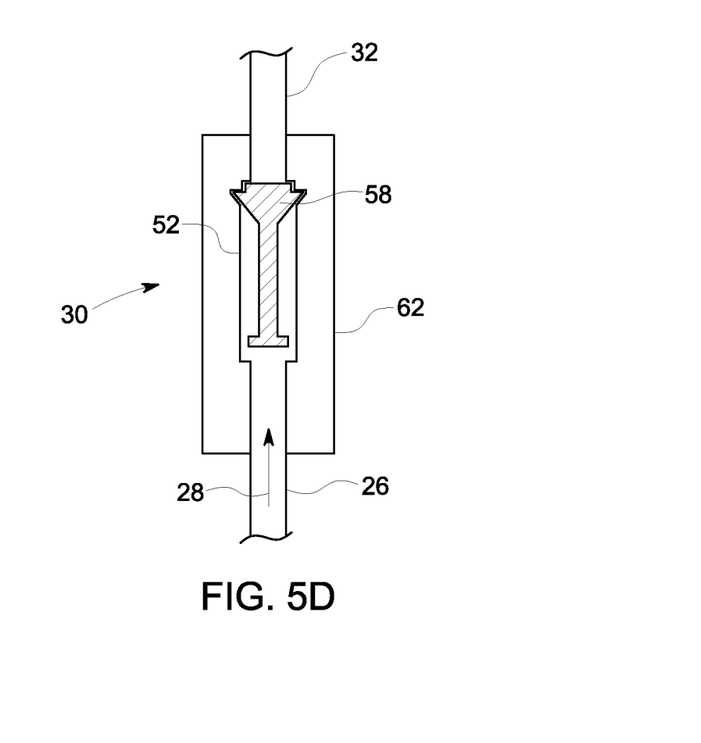

As shown in FIG. 5B, the flexible membrane 52 expands as gas accumulates therein. In FIG. 5C, the gas pressure in the flexible membrane 52 reaching the threshold pressure causes the second end 56 to expand and release the seal with the stopper 52. When this happens, a burst of pressurized gas 60 is released from the flexible membrane 52, past the stopper 58, and through the outlet 32. As the gas exits from the flexible membrane 52, the flexible membrane 52 contracts to its initial unpressurized state as shown in FIG. 5D. The stopper 58 again forms a seal with the second end 56 and the process of filling the flexible membrane 52 with gas repeats.

Alternatively, an aerator 30 with a rigid reservoir and another automatic valve between the aerator 30 and the outlet 32 can be provided. The valve may be configured to open automatically when the threshold pressure is reached, and to stay open until a lower threshold pressure is reached.

Optionally, the flexible membrane 52 may be contained within a shell 62. The shell 62 can be filled with a resilient material. For example, the shell 62 can be sealed to the inlet 26 and the outlet 32 and filled with compressed air. The compressed air may have a higher pressure than the surrounding water. In this way, the compressed air helps the flexible membrane 52 to close on the stopper 58 at a pressure above the surrounding hydrostatic pressure and so enhances the ability of the aerator 30 to produce a higher pressure burst of pressurized gas 60.

This written description uses examples to disclose the invention and also to enable any person skilled in the art to practice the invention. The patentable scope of the invention is defined by the claims, and may include other examples that occur to those skilled in the art.

I claim:

1. A process for providing bubbles to an assembly of filtering membrane modules immersed in water in a tank, comprising the steps of:
    a) passing a pressurized gas through a closed aeration system to a manifold associated with the assembly of immersed filtering membrane modules;
    b) accumulating the pressurized gas in one or more aerators attached to and in fluid communication with the manifold;
    c) releasing a burst of the pressurized gas as bubbles from the one or more aerators into the water in the tank;
    wherein
    each aerator comprises a chamber defined by a flexible membrane, the chamber having a first opening in communication with the pipe for receiving the pressurized gas within the chamber, and a second opening in communication with the water; a stopper adjacent the second opening and inside the chamber, the stopper forming a seal with the flexible membrane when a pressure of the pressurized gas in the chamber is below a threshold pressure, the seal inhibiting fluid communication between the water and the chamber through the second opening, the stopper and the flexible membrane releasing the seal to expel the pressurized gas in the chamber from the aerator as the gas bubbles to the immersed filtering membrane module through the second opening in response to the pressure of the pressurized gas in the chamber reaching the threshold pressure; and steps a), b) and c) are repeated one after the other throughout an aeration period.

2. The process of claim 1, wherein step b) has a duration of between 0.5 and 20 seconds and step c) has a duration of between 5 and 40 seconds.

3. The process of claim 2, wherein step b) has a duration of between 5 and 20 seconds.

4. The process of claim 1, further comprising a step of feeding a supply of the pressurized gas to the one or more aerators throughout step b) and step c).

5. The process of claim 1, wherein the assembly of immersed filtering membrane modules comprise a plurality of distinct modules connected together into a cassette.

6. The process of claim 5, wherein the pressurized gas is passed into the closed aeration system and provided to the manifold by one or more gas blowers in fluid communication with the manifold.

7. The process of claim 1 further comprising a step of dissipating larger bubbles exiting the one or more aerators into smaller bubbles with a deflector located between the one or more aerators and the assembly of immersed filtering membrane modules.

8. The process of claim 1 further comprising a step of redirecting the bubbles exiting the one or more aerators with a deflector located between the one or more aerators and the assembly of immersed filtering membrane modules.

9. An apparatus to provide gas bubbles to an immersed filtering membrane module in water, the apparatus comprising: an immersed filtering membrane module in water;
   a pipe connected to a source of a pressurized gas;
   an aerator comprising
       a chamber defined by a flexible membrane, the chamber having a first opening in communication with the pipe for receiving the pressurized gas within the chamber, and a second opening in communication between with the water;
       a stopper adjacent the second opening and inside the chamber, the stopper forming a seal with the flexible membrane when a pressure of the pressurized gas in the chamber is below a threshold pressure, the seal inhibiting fluid communication between the water and the chamber through the second opening, the stopper and the flexible membrane releasing the seal to expel the pressurized gas in the chamber from the aerator as the gas bubbles to the immersed filtering membrane module through the second opening in response to the pressure of the pressurized gas in the chamber reaching the threshold pressure wherein the flexible membrane is configured to contract around the stopper to form the seal therewith when the pressure of the pressurized gas in the chamber is below the threshold pressure, and to expand beyond the stopper to release the seal when the pressure of the pressurized gas in the chamber reaches the threshold pressure.

10. The apparatus of claim 9, wherein the stopper and the flexible membrane form the seal to accumulate the pressurized gas in the chamber during a first period of time, and the stopper and the aerator release the seal to provide the pressurized gas as the gas bubbles to the immersed filtering membrane module during a second period of time.

11. The apparatus of claim 9, wherein the threshold pressure is greater than a pressure of the water.

12. The apparatus of claim 9 further comprising a deflector at an end of the aerator to disperse the gas bubbles prior to the gas bubbles reaching the immersed filtering membrane module.

13. The apparatus of claim 9 comprising a plurality of aerators circumferentially aligned and longitudinally spaced lengthwise along the pipe.

14. The apparatus of claim 12 wherein a manifold is composed of one or more branches each of which is a cylindrical pipe, and the aerators are longitudinally spaced lengthwise along and circumferentially around a top half portion of each branch.

15. The apparatus of claim 9, wherein the aerator comprises a shell disposed around the flexible membrane and sealed around the first opening and the second opening to define a cavity between the shell and the flexible membrane, the cavity retaining a second gas that exerts a second pressure on the flexible membrane.

16. The apparatus of claim 9, wherein the aerator is configured to inhibit the water from entering the chamber when expelling the pressurized gas from the chamber.

* * * * *

UNITED STATES PATENT AND TRADEMARK OFFICE
CERTIFICATE OF CORRECTION

| | | |
|---|---|---|
| PATENT NO. | : 9,463,419 B2 | Page 1 of 1 |
| APPLICATION NO. | : 13/346176 | |
| DATED | : October 11, 2016 | |
| INVENTOR(S) | : Breitner | |

It is certified that error appears in the above-identified patent and that said Letters Patent is hereby corrected as shown below:

In the Claims

In Column 7, Line 47, in Claim 9, delete "between with" and insert -- with --, therefor.

Signed and Sealed this
Second Day of May, 2017

Michelle K. Lee
*Director of the United States Patent and Trademark Office*